United States Patent
Fujita et al.

(10) Patent No.: US 8,526,060 B2
(45) Date of Patent: Sep. 3, 2013

(54) IMAGE FORMING APPARATUS DISPLAYING JUST A FIRST PAGE OF EACH GROUP OF CONSEQUITIVE COLOR OR MONOCHROMATIC PAGES

(75) Inventors: Takao Fujita, Osaka (JP); Masanori Matsumoto, Osaka (JP); Syoichiro Yoshiura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 467 days.

(21) Appl. No.: 12/607,494

(22) Filed: Oct. 28, 2009

(65) Prior Publication Data

US 2010/0110513 A1    May 6, 2010

(30) Foreign Application Priority Data

Oct. 31, 2008    (JP) .................. 2008-281468

(51) Int. Cl.
- *G06F 3/12* (2006.01)
- *G06K 15/02* (2006.01)
- *H04N 1/40* (2006.01)
- *H04N 1/56* (2006.01)
- *H04N 1/00* (2006.01)

(52) U.S. Cl.
CPC ............ *G06F 3/1256* (2013.01); *H04N 1/0044* (2013.01); *H04N 1/00005* (2013.01); *H04N 1/40062* (2013.01)
USPC .......... 358/2.1; 358/1.13; 358/1.18; 358/527; 715/274; 715/275

(58) Field of Classification Search
USPC ................. 358/2.1, 1.18, 515, 518, 527, 442, 358/1.9, 3.24, 1.13–1.15, 501, 504, 530, 537, 538, 401, 406, 448, 452, 453, 462, 468; 715/273–275

See application file for complete search history.

(56) References Cited

U.S. PATENT DOCUMENTS

| | | | |
|---|---|---|---|
| 5,943,679 A * | 8/1999 | Niles et al. ..................... 715/274 |
| 7,266,768 B2 * | 9/2007 | Ferlitsch et al. .............. 715/273 |
| 7,403,298 B2 * | 7/2008 | Tanaka ......................... 358/1.13 |
| 8,009,303 B2 * | 8/2011 | Kujirai et al. ................ 358/1.13 |
| 8,054,515 B2 * | 11/2011 | Yamakado et al. .......... 358/1.18 |
| 8,335,010 B2 * | 12/2012 | Morimoto et al. ........... 358/1.18 |
| 8,335,986 B2 * | 12/2012 | Carlen et al. ................. 715/274 |
| 2002/0186427 A1 | 12/2002 | Orikasa |
| 2006/0055977 A1 * | 3/2006 | Shiota et al. ................. 358/1.18 |
| 2007/0253020 A1 * | 11/2007 | Hull et al. .................... 358/1.15 |

(Continued)

FOREIGN PATENT DOCUMENTS

| | | |
|---|---|---|
| CN | 1391397 | 1/2003 |
| CN | 101094285 | 12/2007 |

(Continued)

*Primary Examiner* — Scott A Rogers
(74) *Attorney, Agent, or Firm* — Edwards Wildman Palmer LLP; David G. Conlin; Stephen D. LeBarron

(57) ABSTRACT

Provided is an image forming apparatus with a preview function and a monochrome/color automatic detection function, capable of displaying a preview of original image data immediately next a detection result has been switched such as from color to monochrome, or monochrome to color, with a simple operation. On receipt of an operation of a next skip button by a user, a preview image display control portion refers to a detection result recording table and displays a preview of image data of a top page in an image data group (unit) that is next the image data being displayed for previewing currently.

4 Claims, 10 Drawing Sheets

(56) References Cited

U.S. PATENT DOCUMENTS

2007/0297016 A1  12/2007  Ohshima
2008/0018773 A1   1/2008  Nozawa
2012/0075654 A1* 3/2012  Kuroda .................. 358/1.13

FOREIGN PATENT DOCUMENTS

| CN | 101110907 | 1/2008 |
|---|---|---|
| JP | 2004-214794 | 7/2004 |
| JP | 2006-086629 | 3/2006 |

* cited by examiner

IMAGE FORMING APPARATUS DISPLAYING JUST A FIRST PAGE OF EACH GROUP OF CONSEQUITIVE COLOR OR MONOCHROMATIC PAGES

CROSS-NOTING PARAGRAPH

This non-provisional application claims priority under 35 U.S.C. §119(a) on Patent Application No. 2008-281468 filed in JAPAN on Oct. 31, 2008, the entire contents of which are hereby incorporated herein by reference.

FIELD OF THE INVENTION

The present invention relates to an image forming apparatus having a preview function and a monochrome/color automatic detection function, and more particularly, to an image forming apparatus that improves convenience in confirming whether monochrome/color detection is appropriately performed by using the preview function.

BACKGROUND OF THE INVENTION

An image forming apparatus having a function of automatically detecting whether an original is a monochromatic original or a color original and making a monochromatic copy or a color copy based on a detection result, has been proposed (see Japanese Laid-Open Patent Publication No. 2006-86629).

When the function is used, in the case of copying a bundle of originals in which a monochromatic original/color original are mixed, the bundle of originals is set on an Auto Document Feeder (ADF) and copying is instructed, a monochromatic copy/color copy is automatically made in accordance with a monochromatic original/color original.

However, when the image forming apparatus erroneously performs monochrome/color detection (color detection), a color copy is made for a monochromatic original or a monochromatic copy is made for a color original.

For example, when an original on which a red seal is put is copied with the use of the function, in a case where the seal is small or the color is light, the ratio of the color part in the original is small, the original is determined as a monochromatic original not as a color original, then a monochromatic copy, instead of a color copy, is made in some cases.

Alternatively, an original having a ground color like coarse paper (straw paper), even in the case of being a monochromatic original, is erroneously determined as a color original in some cases.

In such a case, a user is required to check all the obtained copies to confirm whether the color detection is correctly performed after copying a bundle of originals in which a monochromatic original/color original are mixed.

In a case where color detection has been erroneously performed for even one sheet in the bundle of originals in the above checking, it is necessary to make all the copies again, or pick up an erroneously detected original from the bundle of originals, make a copy again with a correct setting to replace the erroneously copied paper.

When a copy is made using an automatic detection function in this manner, a printing member such as copy paper or a toner is wasted in some cases, and additionally, time for making a copy again is wasted.

Meanwhile, an image forming apparatus having a so-called preview display function, for confirming by displaying a printing image (image data) on a display panel or the like before copying or printing has been proposed. The user, with the use of the preview display function, is able to confirm the printing image before making a copy to cut out the waste of the printing member or the trouble of making a copy again.

By the way, in the image forming apparatus having the preview display function, when an instruction of displaying a preview from a user is received, image data of a firstly scanned original is displayed. It is usual that the image data of the original is sequentially displayed sheet (one image data) by sheet thereafter by an instruction operation of the user.

Accordingly, in the case of scanning a bundle of originals in which 10 pages of monochromatic originals and 10 pages of color originals are repeated, for example, and confirming whether the color detection of originals included in the bundle of originals are performed correctly, it is necessary to operate an instruction button (next display button) and display a preview of image data of the original sheet by sheet sequentially.

In the above-described example, the user needs to operate the instruction button 10 times for displaying the preview of aimed image data of the original in order to confirm whether or not the color detection is performed correctly on the 11th color original, however, such an operation is too troublesome for the user.

Meanwhile, in the case of confirming whether or not the color detection is performed correctly on the original, it is assumed that the user thinks that he/she may make a copy actually after displaying a preview of original image data immediately after (next) a detection result has been switched from color to monochrome or monochrome to color, or original image data before (previous) or after (next) the original image data to confirm that the color detection is performed correctly.

SUMMARY OF THE INVENTION

An object of the present invention is, in an image forming apparatus having a preview function and a monochrome/color automatic detection function, to provide an image forming apparatus capable of displaying a preview of original image data immediately next a detection result has been switched from color to monochrome or monochrome to color with a simple operation.

Another object of the present invention is to provide an image forming apparatus comprising: a detecting portion that detects whether an original to be scanned is a monochromatic original or a color original; a detection result recording portion that, in accordance with image data of a scanned original, in order of the scanned original, records a detection result showing whether the original has been detected as a monochromatic original or a color original; and a preview image display control portion that refers to the recorded detection result and displays a preview of image data of each top page in every group of image data showing the same detection result.

Another object of the present invention is to provide the image forming apparatus, wherein the preview image display control portion, on receipt of next/previous skip instruction operation, displays a preview of image data of a top page in an image data group that is next/previous to the image data being displayed for previewing currently.

Another object of the present invention is to provide the image forming apparatus, wherein the preview image display control portion, together with a preview display of image data, displays a detection result showing whether an original corresponding to the image data has been detected as a monochromatic original or a color original.

Another object of the present invention is to provide the image forming apparatus, wherein the preview image display control portion, in a case where color detection of image data displayed for previewing has been erroneous detection, on receipt of modification instruction operation from a user, modifies a detection result of the image data displayed for previewing recorded in the detection result recording portion, and displays a preview again based on a detection result after modification.

PREFERRED EMBODIMENTS OF THE INVENTION

Description will be given for an outline of an image forming apparatus according to the present invention using FIGS. 1A and 1B.

Figure 1A:
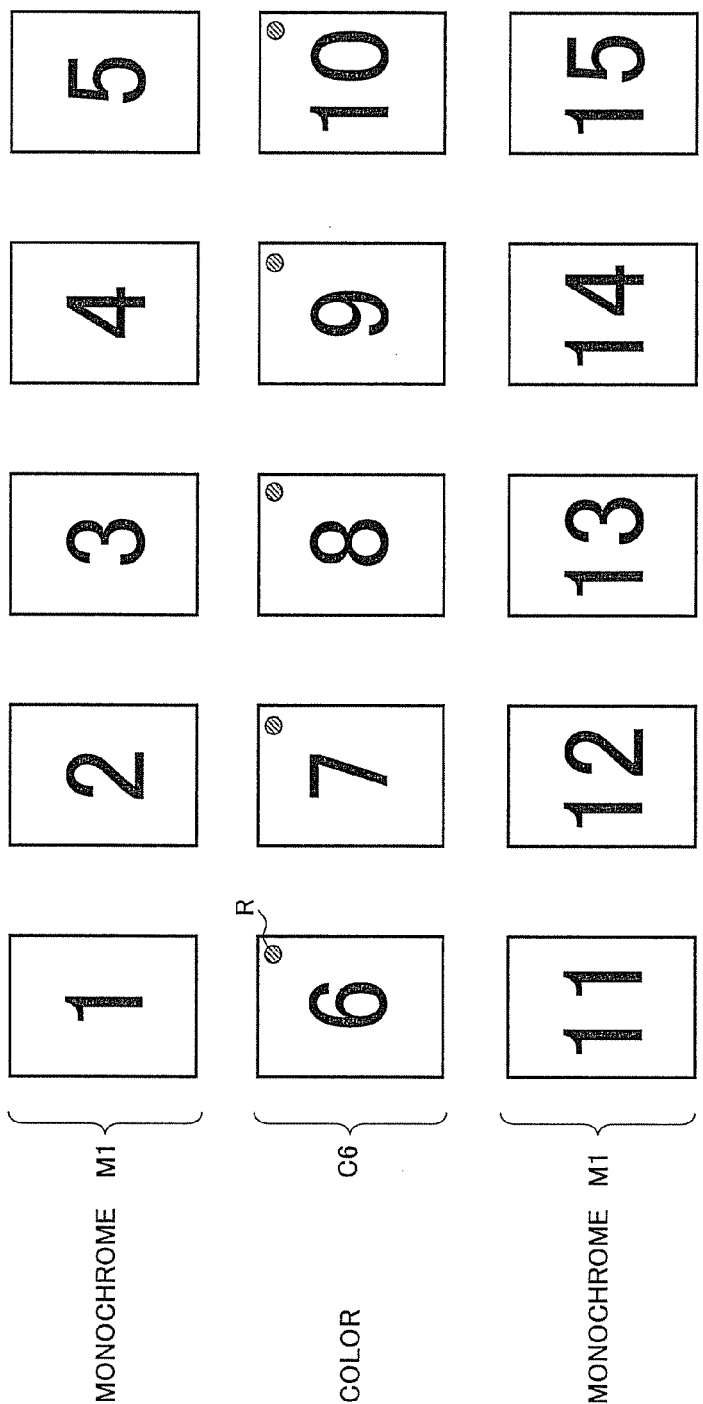
FIGS. 1A and 1B are diagrams for explaining an outline of an image forming apparatus according to the present invention.

FIG. 1A is a diagram for showing a bundle of color originals and bundle of monochromatic originals which are to be copied.

M1 and M11 respectively show a bundle of monochromatic original consisting of 5 sheets of monochromatic originals, and C6 shows a bundle of color original consisting of 5 sheets of color originals.

On a surface of a copy original, the number of sheets of originals ("1" to "15") is assumed to be described, and on the upper right of the color originals ("6" to "10"), a red seal is assumed to be put (see denotation R).

Figure 1B:
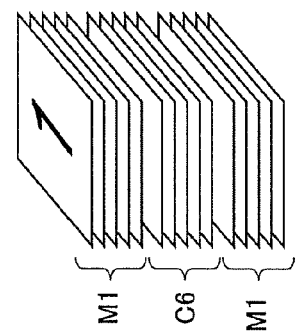

Here, when a user operates the image forming apparatus according to the present invention to shift to a monochrome/color automatic detection mode, and as shown in FIG. 1B, sets the above originals on an ADF and instructs a scan and a preview display, the original is scanned so that image data is generated/recorded. At this time, whether the original is a monochromatic original or a color original is detected, and a detection result is recorded.

Thereafter, a preview of image data "1" corresponding to a first original is displayed.

In conventional image forming apparatuses, whether or not a color original is correctly detected automatically is confirmed with a preview display by operating a next original display button 5 times so that a preview of image data "6" of an original included in the bundle of color originals C6 is displayed.

However, in the image forming apparatus according to the present invention, by operating a next skip button once, a preview of the image data "6" can be immediately displayed.

Figure 2:
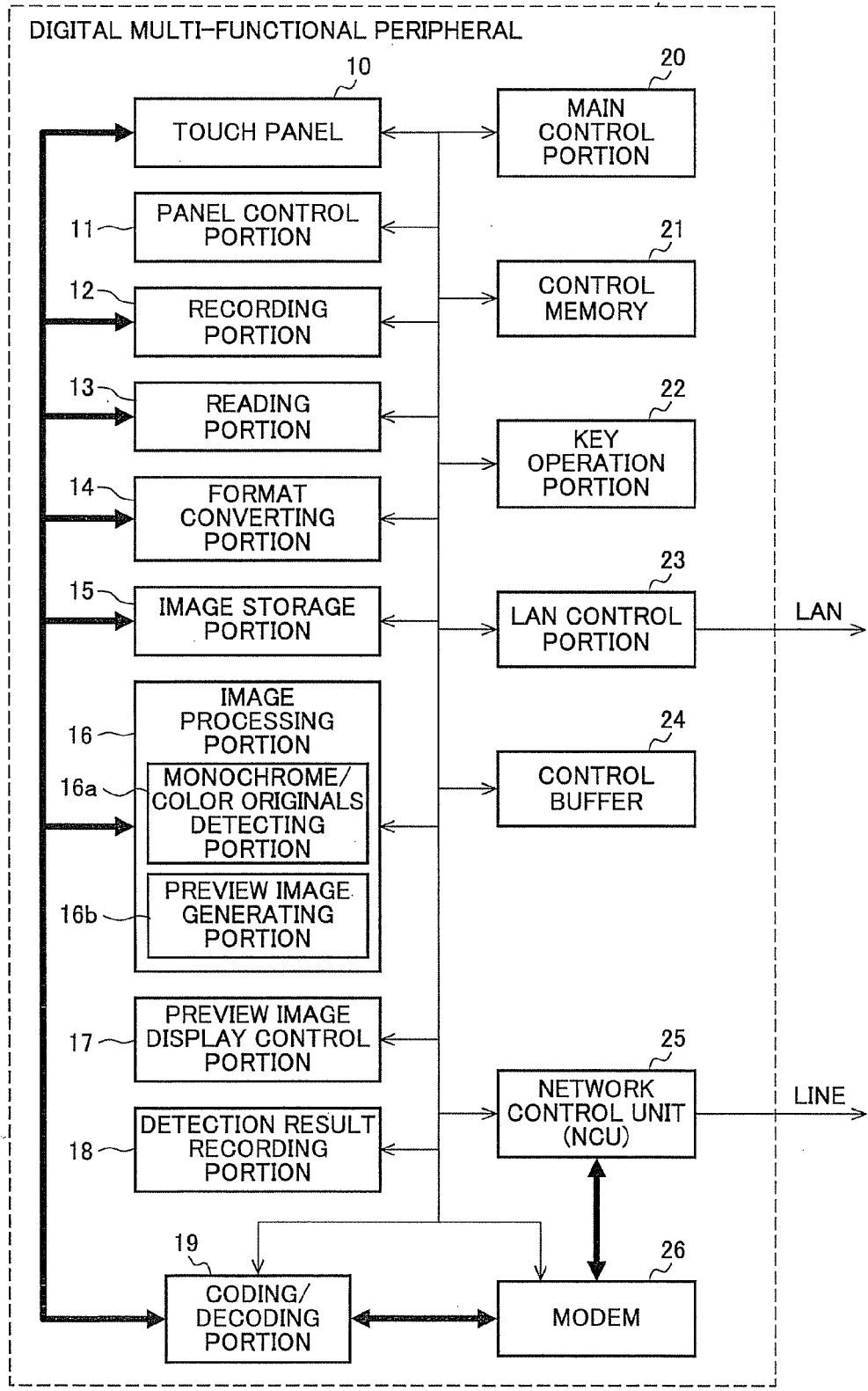
FIG. 2 is a schematic block diagram for showing an exemplary configuration of the image forming apparatus according to an embodiment of the present invention.
Figure 3:
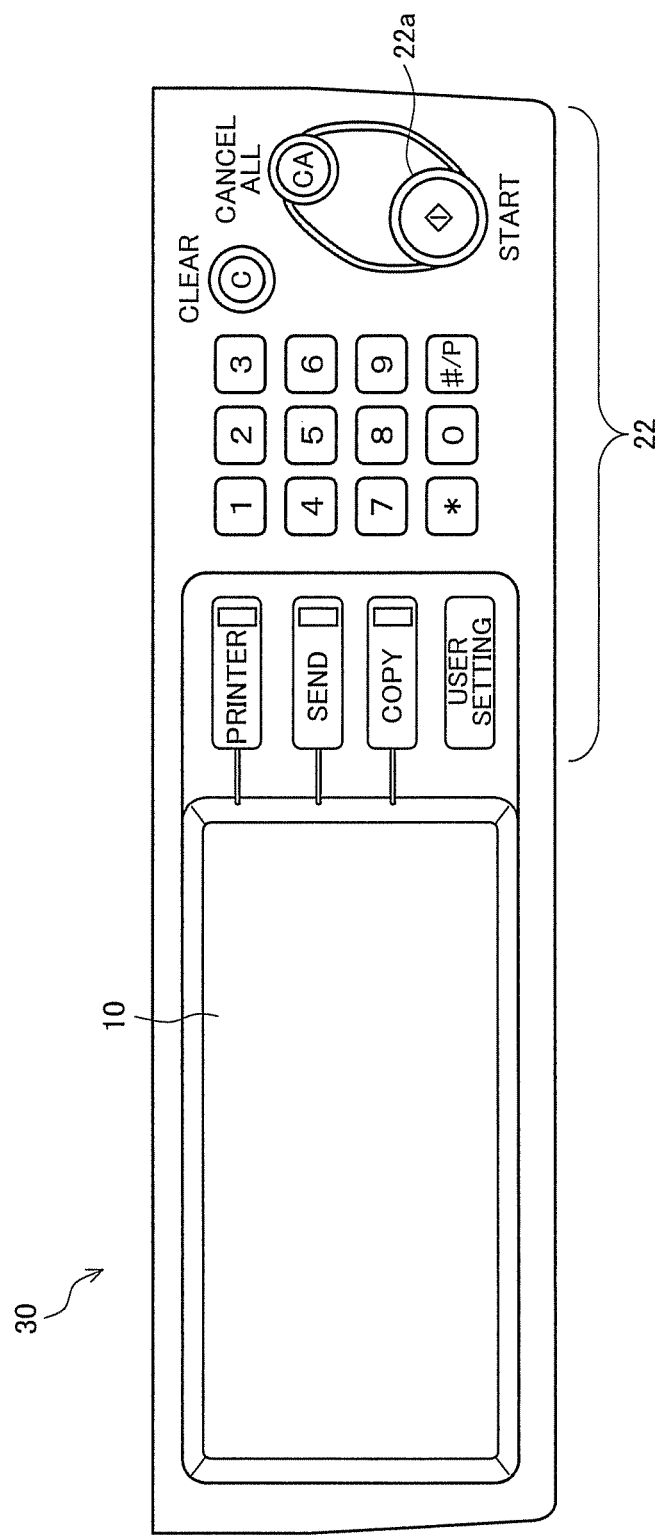
FIG. 3 is a diagram for showing an example of an operation panel.

FIG. 2 is a schematic block diagram for showing an exemplary configuration of the image forming apparatus according to an embodiment of the present invention, and the image forming apparatus in the illustrated example is configured as a digital multi-functional peripheral having a print function and a facsimile sending function, etc., to be used for a duplicating operation, or the like. FIG. 3 is an external view for showing an example of a touch panel and a key operation portion in the multi-functional peripheral of FIG. 2.

The image forming apparatus configured as a multi-functional peripheral (hereinafter, referred to as a digital multi-functional peripheral) 1 is provided with a touch panel 10, a panel control portion 11, a recording portion 12, a reading portion 13, a format converting portion 14, an image storage portion 15, an image processing portion 16, a preview image display control portion 17, a detection result recording portion 18, a coding/decoding portion 19, a main control portion 20, a control memory 21, a key operation portion 22, a LAN (Local Area Network) control portion 23, a control buffer 24, a network control unit (NCU) 25, and a modem 26.

The main control portion 20 is comprised of a CPU (Central Processing Unit) or the like, and the control memory 21 is comprised of a nonvolatile memory or the like, such as a ROM (Read Only Memory). A program (firmware) and various setting data are stored in the control memory 21 so as to be readable from the main control portion 20. Further, the control buffer 24 is comprised of a volatile memory such as a RAM (Random Access Memory).

The above-described program is a control program that is executed by the main control portion 20 such as a command for reading an original according to the present invention, a command for generating and displaying a preview image, a command for generating/sending/receiving a facsimile image and an electronic mail, etc., and a command for printing. This program is extracted by the main control portion 20 on the control buffer 24 and is executed by referring to various setting data appropriately with the control buffer 24 as a data area for temporal saving (working).

The reading portion 13 is provided with an Auto Document Feeder (ADF) that feeds originals mounted on an original mounting table (not shown) sheet by sheet, and images of the originals fed by the ADF can be read page by page by using a CCD (Charge Coupled Device) or the like, and the read image data of RGB (R:Red, G:Green, and B:Blue) is output to the image processing portion 16. Additionally, the reading portion 13 is provided with a counter (not shown) and which page of the original is being read or the total number of pages of the original can be counted by using the counter, a paper detecting censor of the ADF, or the like.

The image processing portion 16 is provided with a monochrome/color original detecting portion 16a for detecting whether an original to be scanned is a monochromatic original or a color original.

There are various detection methods proposed, and as an example, a method such that in a case where the number of monochromatic pixels of image data according to the scanned original are equal to or more than a predetermined ratio to the total pixel number of the image data, the original corresponding to the image data is detected as a monochromatic original, can be used. Note that, the monochromatic pixel means to be the pixel of which R value, G value and B value satisfy a relationship of R=G=B.

Furthermore, the image processing portion 16 outputs, for each image data of the scanned original, information showing that the original corresponding to the image data is detected as a monochromatic original by the monochrome/color original detecting portion 16a, or information showing that the original corresponding to the image data is detected as a color original (detection result) to the detection result recording portion 18. Note that, details of the detection recording portion 18 will be described below.

Furthermore, the image processing portion 16 is provided with a preview image generating portion 16b. The preview image generating portion 16b, for example, performs various image adjustment processing (image processing for displaying a preview) to image data stored in the image storage portion 15 based on a set output condition, and generates a preview image. The image processing for displaying a preview includes color correction processing to convert image data based on display characteristics of the touch panel 10, image enlarging/reducing processing in accordance with a printing copy ratio, or the like.

In addition, the preview image generating portion 16b outputs a generated preview image to the image storage portion 15. The preview image stored in the image storage portion 15 is displayed on the touch panel 10 on receipt of a control of the preview image display control portion 17.

Note that, the image processing portion 16 performs various image processing to the image data to be processed. For example, image processing in reading an original including A/D conversion, etc., to the RGB image data from the reading portion 13 is performed (original image processing). The image data after subjected to the original image processing is stored in the image storage portion 15. The image processing portion 16 performs, in printing of the image data stored in the image storage portion 15 or sending (outputting) thereof to an external apparatus, based on the set output condition (such as an output condition relating to a printing copy ratio or setting information of, so-called N-up printing) etc., image processing for printing or image processing for fax sending to the image data. The image processing for printing or image processing for fax sending includes image quality adjustment processing, etc., in accordance with an output form. Note that, the set output condition is stored in the control memory 21.

The preview image display control portion 17 refers to a detection result recorded in the detection result recording portion 18 and displays a preview of image data of each top page in a group of image data showing an identical detection result.

The format converting portion 14 converts read image data or image data received from outside into a predetermined file format such as a PDF (Portable Document Format).

The recording portion 12 is provided with a printer apparatus that employs a printing system such as an electrophotographic system, and records (that is, prints) image data and the like stored in the image storage portion 15 on recording paper. For example, recording is performed based on image data subjected to image processing for printing.

The image storage portion 15 is comprised of a hard disc or the like, and stores image data that has been passed from the reading portion 13 through the image processing portion 16 or the like, for each original page.

The coding/decoding portion 19 compresses image data by coding and decodes (expands) the coded image data to original image data. For example, the coding/decoding portion 19 performs coding of image data read from an original, decoding of the coded data, decoding of coded image data received from outside, and the like. In the coding/decoding portion 19, coding system corresponding to purposes is usable, including JPEG (Joint Photographic Experts Group) that is generally used in filing.

The modem 26 is comprised of a facsimile modem capable of facsimile communication, and is connected to a telephone line and is directly connected to the NCU 25. The NCU 25 connects the modem 26 to the public switched telephone network as the occasion demands. Such a configuration makes it possible to send image data stored in the image storage portion 15 to outside by facsimile or the like.

The LAN control portion 23 is connected to a LAN and performs communication of electronic mail data and communication of internet facsimile (internet FAX) via an internet.

The touch panel 10 or the key operation portion 22 of FIG. 3 receives an operation for selecting desired processing out of processing of reading an original, processing of printing, etc., an operation for starting the processing, an operation for performing a setting that is necessary when each processing is executed (a selecting operation or an inputting operation), and the like. The touch panel 10 and the key operation portion 22 may be configured as an operation panel 30 as illustrated in FIG. 3. The key operation portion 22 is provided with a key group which is necessary for operation such as a start key 22a for receiving instructions of start of original reading or the like.

The touch panel 10 is provided with a display portion such as a liquid crystal display and an operation reception portion such as a touch sensor. In the touch panel 10, the display control and the operation reception control are performed by the panel control portion 11.

The panel control portion 11 performs display control of the display portion and operation reception control of the operation reception portion in the touch panel 10.

The display on the touch panel 10 is realized by the panel control portion 11 controlling so that a GUI (Graphical User Interface) image/preview image is displayed. Each GUI/preview image may be stored in an internal memory or the control memory 21 of the panel control portion 11 so as to be readable.

Description will hereinafter be given for preview display processing of the present invention. First, a user sets an bundle of originals consisting of 5 sheets of monochromatic originals, 5 sheets of color originals, and 5 sheets of monochromatic originals illustrated in FIGS. 1A and 1B, on the ADF of the digital multi-functional peripheral 1.

Figures 4, 5:
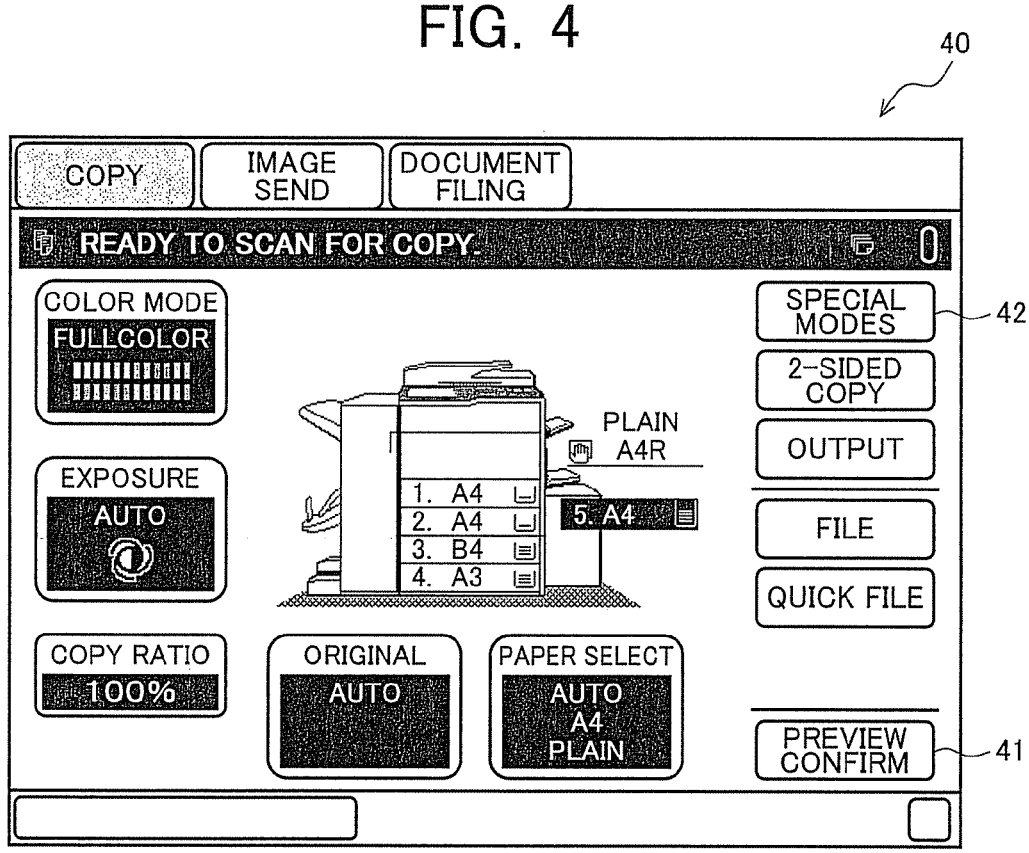
FIG. 4 is a diagram for showing an example of a GUI image to be displayed as a standard screen on a touch panel.
FIG. 5 is a diagram for showing an example of a detection result recording table.

Then, the digital multi-functional peripheral 1 detects original setting by the user and displays a standard screen of the digital multi-functional peripheral 1 of FIG. 4, on a touch panel 10. FIG. 4 shows an example of a GUI image (referred to as a GUI image 40) that is displayed on the touch panel 10 as the standard screen. The GUI image 40 is displayed on the touch panel 10 when an original is set on the ADF and a power source of the digital multi-functional peripheral 1 is turned on/reset. The GUI image 40 shows a state where a copy mode is selected.

Various condition settings when making a copy are possible in the GUI image 40, and a print condition set through a key that is displayed in the GUI image 40, is stored in a control memory 21 when original reading is started and applied to the entire originals.

In the GUI image 40, a preview confirm button 41 for displaying a preview of an original read by a reading portion 13 is also displayed.

Here, the user operates a special modes button 42 and sets a monochrome/color automatic detection mode.

Additionally, the user, in order to instruct the digital multi-functional peripheral 1 to scan the set originals and display a preview thereafter, sets the preview confirm button 41 to be turned ON for inversion and depresses a start key 22$a$ (see FIG. 3), and then image data of the scanned originals is sequentially generated by the reading portion 13 of the digital multi-functional peripheral 1, is subjected to various image processing by an image processing portion 16, and is stored in an image storage portion 15.

At the same time, a monochrome/color original detecting portion 16$a$ detects whether an original corresponding to the image data scanned by the reading portion 13 is a monochromatic original or a color original, and then, outputs the detection result of the image data to a detection result recording portion 18.

The detection result recording portion 18 that has received the detection result, records the detection result showing whether the original is detected as a monochromatic original or a color original, in accordance with the image data of the original scanned by the reading portion 13, in order of the scanned original, in a table format, for example.

FIG. 5 shows an example of a detection result recording table 101 that is recorded in the detection result recording portion 18 in a case where the bundle of originals illustrated in FIGS. 1A and 1B is scanned.

101$a$ is a column for the name of image data where the names of image data of the originals are recorded in order of being scanned.

101$b$ is a column for the detection result where the detection result is recorded in accordance with the image data.

In the detection result recording table 101, as an image data group (unit) of an original detected as a monochromatic original, image data "1" to image data "5"/image data "11" to image data "15", are recorded, and as an image data group (unit) of an original detected as a color original, image data "6" to image data "10" are recorded.

At the same time, a preview image for displaying a preview is generated by a preview image generating portion 16$b$ and stored in the image storage portion 15.

When the above processing is completed, a preview image display control portion 17 displays a preview of image data corresponding to the firstly scanned original. Here, a preview image $50_1$ is displayed on the touch panel 10.

51$m$ is a preview image of the image data "1" corresponding to an original of the top page in the bundle of monochromatic original M1.

The display control portion 17 displays a preview of image data together with a detection result showing whether an original corresponding to the image data has been detected as a monochromatic original or as a color original.

52 is a next original display button (described hereinafter as a next button), 53 is a next skip button, 54 is a fast next skip button, 55 is a previous original display button (described hereinafter as a previous button), 56 is a previous skip button, 57 is a fast previous skip button, 58 is a reset button, and 59 is a copy start button, and the function of each button will be described below.

On receipt of the operation of the next skip button 53 (next skip instruction operation) by a user, the preview image display control portion 17 refers to the detection result recording table 101 of FIG. 5 and display a preview of image data of a top page in an image data group (unit) that is next the image data being displayed for previewing currently. (It shows a detection result different from a detection result of the image data being displayed for previewing.)

Figure 6:
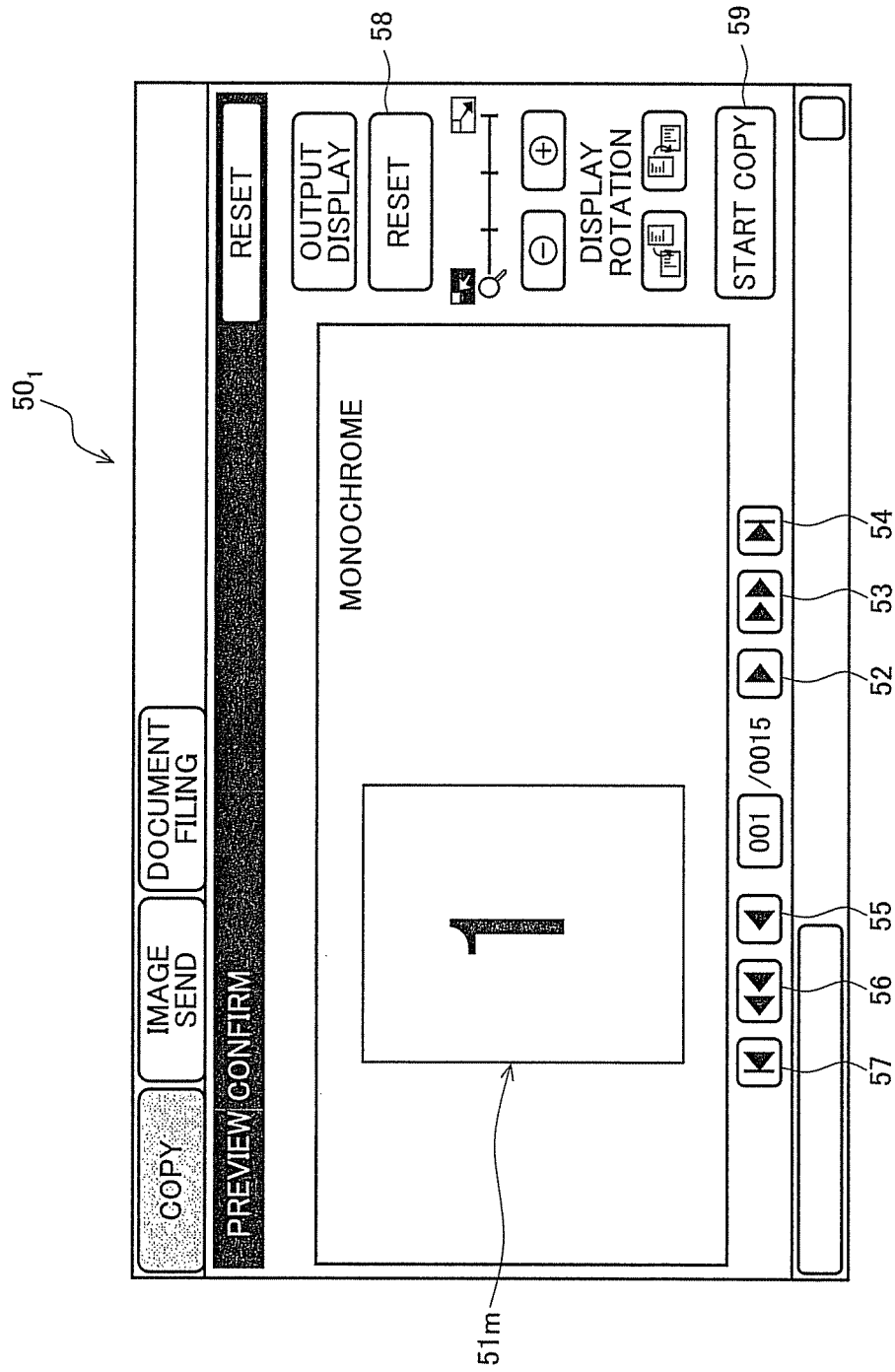
FIG. 6 is a diagram for showing an example of a preview image.

In the examples of FIGS. 1A, 1B and 5, a detection result of image data being displayed for previewing (image data "1" of FIG. 5) in the preview image $50_1$ of FIG. 6 is "monochrome" so that an image data group showing a detection result ("color"), next (immediately next) the image data, different from the detection result is image data "6" to image data "10" of FIG. 5.

Figure 7:
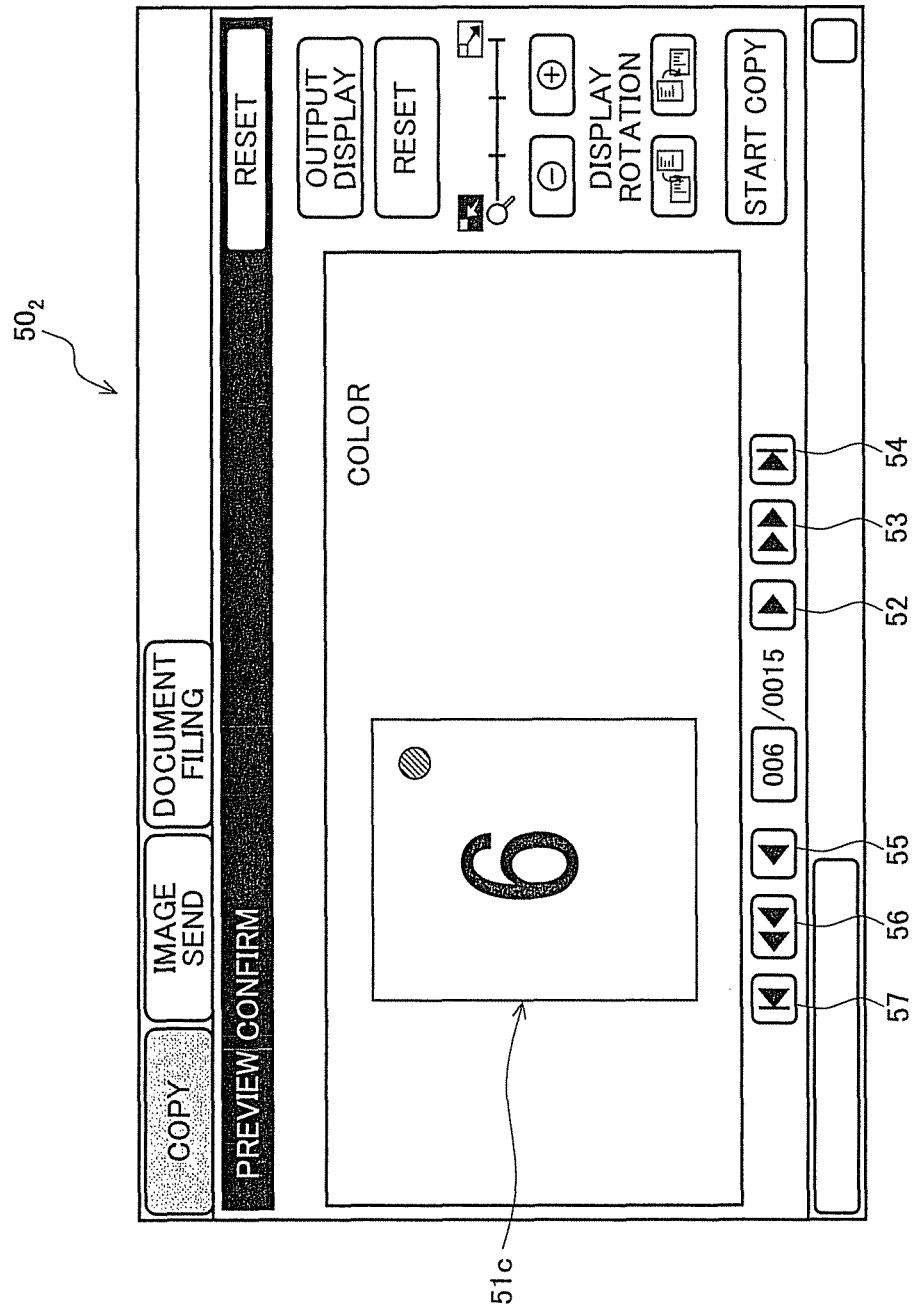
FIG. 7 is a diagram for showing another example of a preview image.

Image data of a top page in the image data group is the image data "6" so that a preview image display control portion 17 displays a preview image $50_2$ shown in FIG. 7, for example, on a touch panel 10.

51$c$ is a preview image of the image data "6" corresponding to an original of the top page on the bundle of color original C6.

Figure 8:
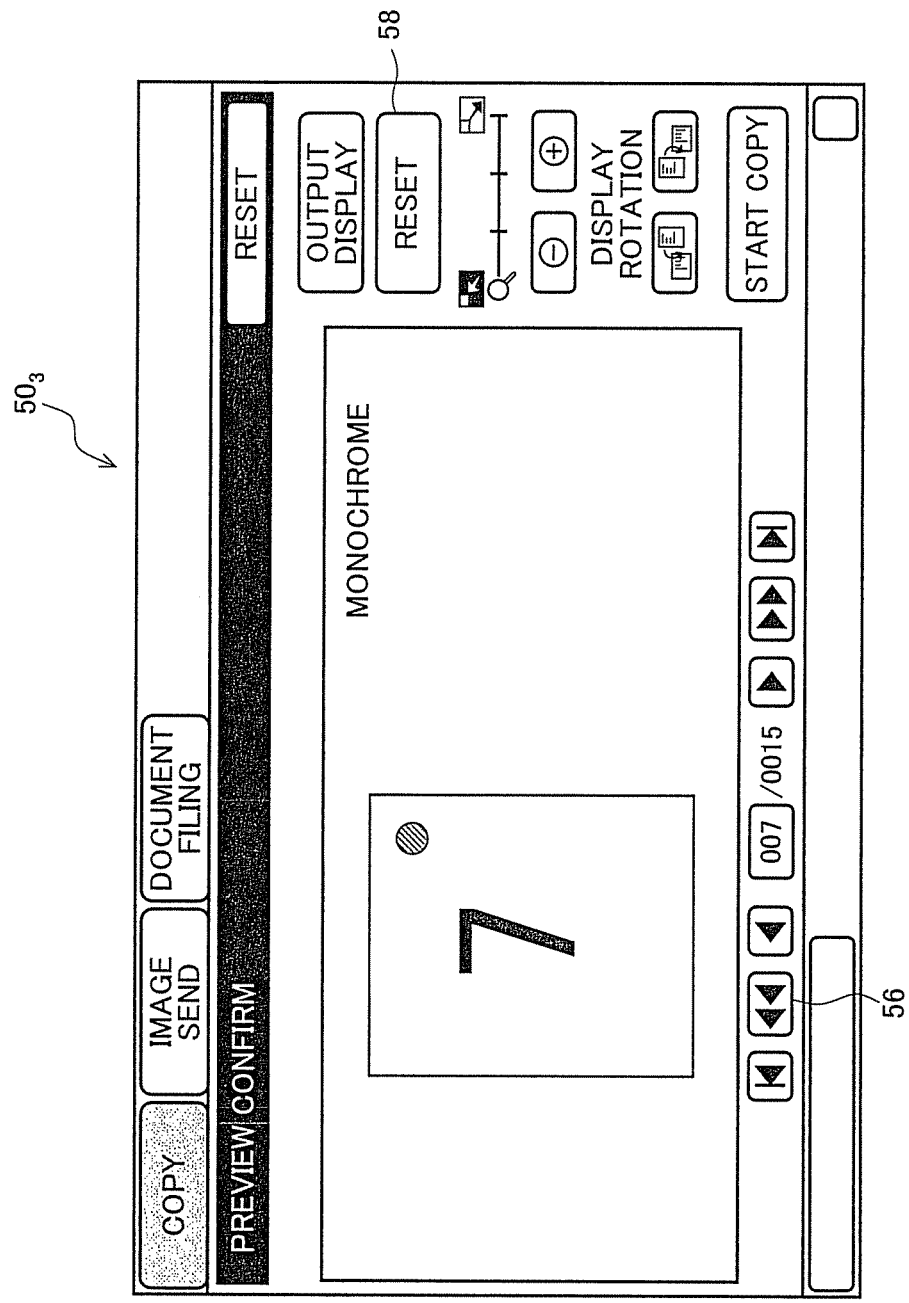
FIG. 8 is a diagram for showing another example of a preview image.

Here, when the user operates a next button 52, the preview image display control portion 17 displays a preview image of image data "7" that is image data next to image data being displayed for previewing (image data "6"), for example, a preview image $50_3$ shown in FIG. 8. Note that, in a case where a previous button 55 is operated, the display control portion 17 displays a preview image of image data "5" that is image data previous to image data being displayed for previewing.

Here, an original corresponding to image data "7" is a color original, however, is assumed to be erroneously detected as a monochromatic original. Note that, detection result of a detection result recording table 101 is assumed to be set to be monochrome similarly.

Figure 9:
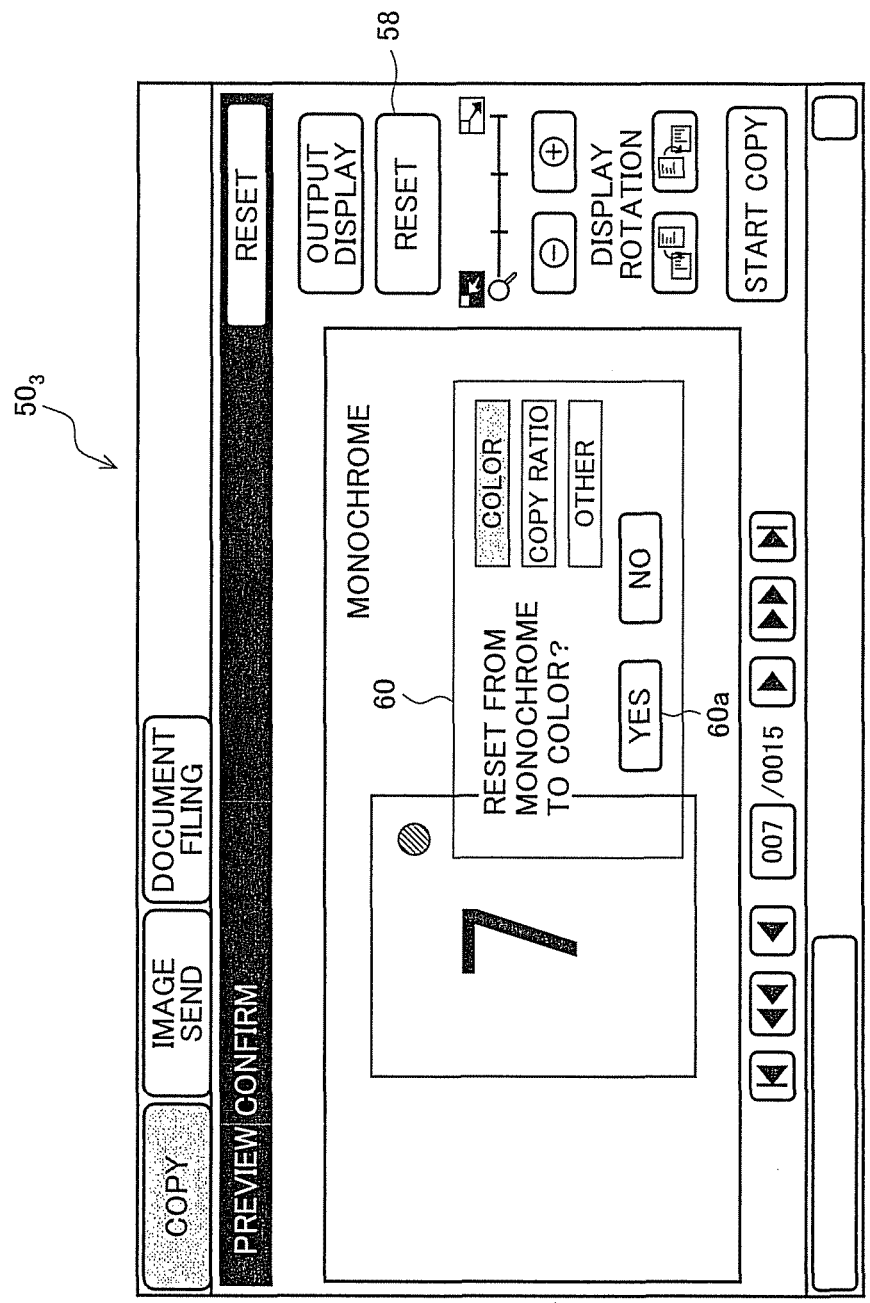
FIG. 9 is a diagram for showing an example of a reset screen.

In a case where color detection of image data displayed for previewing has been erroneous detection, when the user operates a reset button 58 (instruction operation for modification from the user), the preview image display control portion 17 receives the operation and displays a reset screen 60 shown in FIG. 9.

Figure 10:
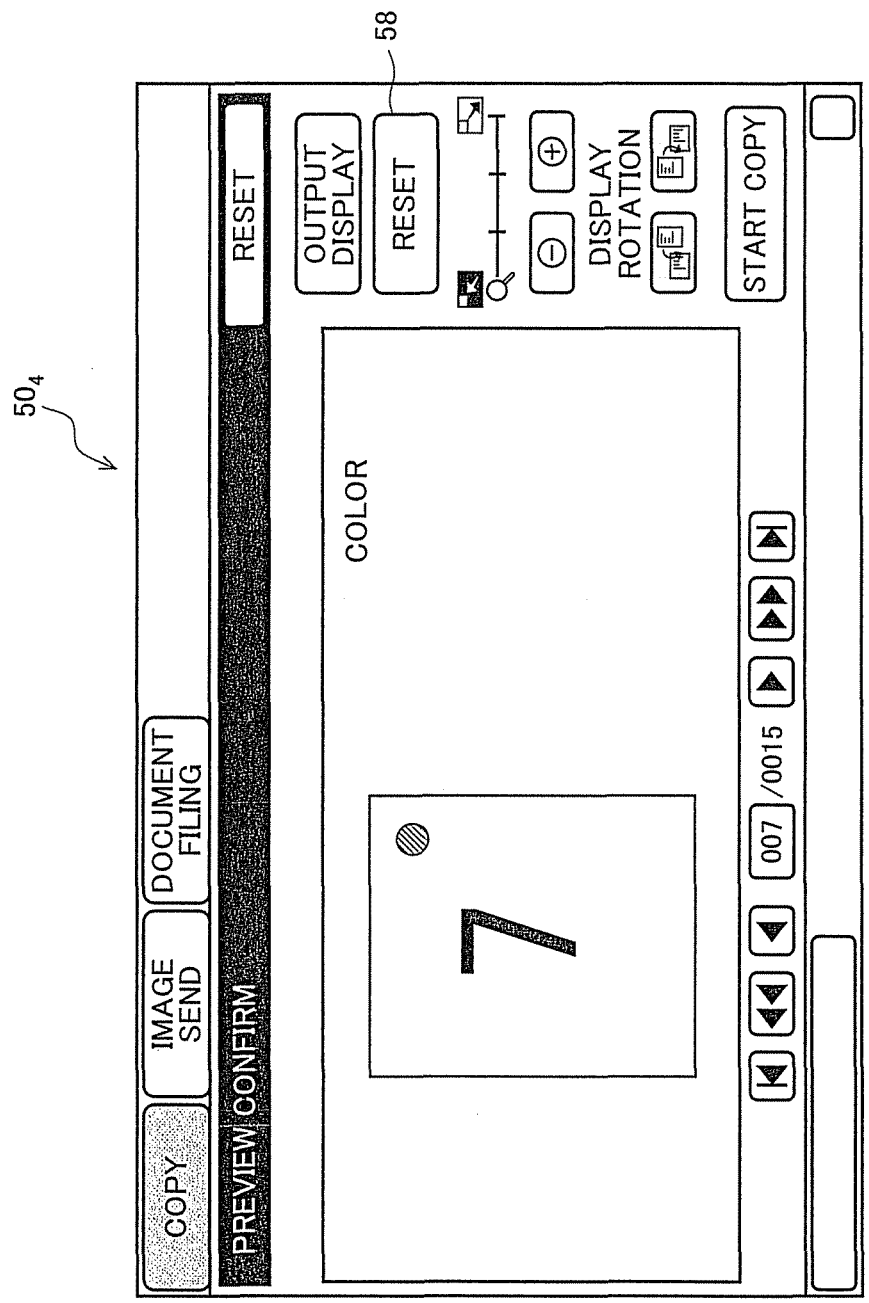
FIG. 10 is a diagram for showing another example of a preview image.

When the user operates a "Yes button" 60$a$ on a reset screen 60, the display control portion 17 performs a preview display as shown in a preview image $50_4$ of FIG. 10 based on the detection result after modification.

At the time, the display control portion 17 modifies a detection result of the image data displayed for previewing (image data "7") recorded in the detection result recording table 101 of the detection result recording portion 18 from monochrome to color.

Note that, on receipt of an operation of a previous skip button 56 (previous skip instruction operation) by the user in the preview image $50_3$ shown in FIG. 8, the preview image display control portion 17 displays a preview of image data of a top page in an image data group that is previous (immediately previous) to the image data being displayed for previewing currently.

In the above example, the preview image $50_1$ of FIG. 6 is displayed.

When the user operates a fast next skip button 54 in the preview image $50_1$ of FIG. 6, the preview image display control portion 17 refers to the detection result recording table 101 and displays a preview of first or last image data (image data "11" or image data "15") in the image data group at the end of the table 101.

When the user operates a fast previous skip button 57 in the preview image $50_2$ of FIG. 7, the preview image display control portion 17 refers to the detection result recording table 101 and displays a preview of first or last image data (image data "1" or image data "5") in an image data group in the table 101.

When the user displays each preview image by button operation described above, confirms whether color detection is performed appropriately, and operates a copy start button 59, a recording portion 12 prints (copies) image data "1" to image data "15" recorded in an image storage portion 15 on recording paper.

Note that, as well as copying, the image data "1" to the image data "15" stored in the image storage portion 15 may be subjected to file conversion to PDF and the like by a format converting portion 14 and stored in the image storage portion 15.

Alternatively, the data may be attached to an electronic mail or sent to a predetermined destination using internet FAX.

Figure 11:
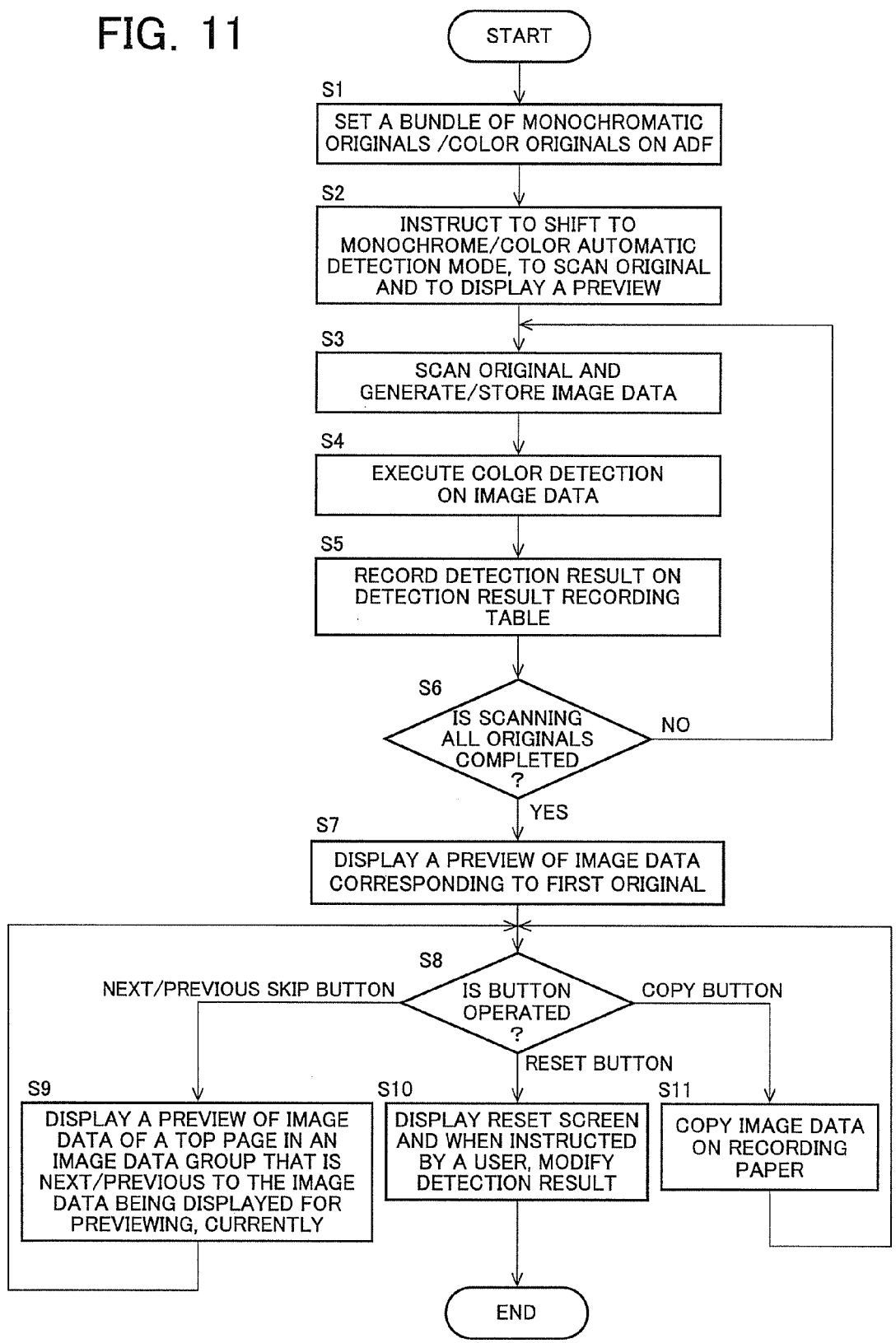
FIG. 11 is a flowchart for explaining preview image display processing.

Next, description will be given for preview image display processing described above using a flowchart of FIG. 11.

A user sets an bundle of original consisting of a monochromatic original/color original on an ADF of the digital multifunctional peripheral 1 (step S1), instructs the digital multifunctional peripheral 1 through the touch panel 10 to shift to a monochrome/color automatic detection mode and to display a preview after scanning the original (step S2).

The reading portion 13 of the instructed digital multifunctional peripheral 1 scans the original sequentially, generates image data and the image data is stored in the image storage portion 15 (step S3).

At the same time, the monochrome/color original detection portion 16a executes color detection on the image data generated at step S3 (step S4), the detection result recording portion 18 records a detection result of the image data on the detection result recording table 101 (step S5).

When processing from step S3 to step S5 is repeated (in the case of NO at step S6), and scanning of all the originals are completed (in the case of YES at step S6), the preview image display control portion 17, as shown in the preview image 50$_1$ of FIG. 6, displays a preview of image data corresponding to a firstly scanned original (step S7).

When the user operates the next skip button 53 (step S8/next skip button), the preview image display control portion 17 refers to the detection result recording table 101 and displays a preview of image data of a top page in an image data group that is next the image data being displayed for previewing currently (step S9). Note that, in a case where the previous skip button 56 is operated, a preview of image data of a top page in an image data group that is previous to the image data being displayed for previewing currently is displayed.

When the user operates the reset button 58 (step S8/reset button), the preview image display control portion 17 displays the reset screen 60, and with reset instruction from the user performed (operation of "Yes button" 60a), modifies a preview display and the detection result (step S10).

Note that, in a case where the next original display button 52, the fast next skip button 54, previous button 55, previous skip button 57 are operated, a preview image corresponding to each button is displayed.

When the user operates the copy start button 59, the recording portion 12 prints (copies) image data stored in the image storage portion 15 on recording paper (step S11).

Thus, only by operating the next skip button 53/previous skip button 56 once, it is possible to display a preview of original image data immediately next a detection result has been switched from color to monochrome or monochrome to color so that convenience for the user is improved.

Additionally, in the case of being erroneously detected, color detection is modified with easy operation and the modification result can to be displayed for previewing so that convenience for the user is improved.

Note that, for example, in a case where a previous skip button 56 is operated when a preview of image data "2" is displayed, an image data group that is previous to the image data being displayed for previewing currently does not exist. Then, top image data in an image data group showing the same detection result including the image data "2", that is, image data "1" may be displayed for previewing.

Alternatively, in a case where a next skip button 53 is operated when image data "12" is displayed for previewing, as described above, the top image data in an image data group showing the same detection result including the image data "12", that is, the image data "11" may be displayed for previewing.

According to the invention, the following effect will be obtained.

According to the present invention, an image forming apparatus having a preview function and a monochrome/color automatic detection function, is able to display a preview of original image data immediately next a detection result has been switched from color to monochrome or monochrome to color, and improves convenience for a user.

The invention claimed is:

1. An image forming apparatus comprising:
   a detecting portion that detects whether an original to be scanned is a monochromatic original or a color original;
   a detection result recording portion that, in accordance with image data of a scanned original, in order of the scanned original, records a detection result showing whether the original has been detected as a monochromatic original or a color original; and
   a preview image display control portion that refers to the recorded detection result and displays as a preview of image data just a first page of each group of image data showing the same detection result wherein each group of image data is made up of a plurality of consecutive pages that have the same detection results.

2. The image forming apparatus as defined in claim 1, wherein
   the preview image display control portion, on receipt of next/previous skip instruction operation, displays as a preview of image data a next first page of a next image data group that is next/previous to the image data being displayed for previewing currently.

3. The image forming apparatus as defined in the claim 1 or 2, wherein
   the preview image display control portion, together with a preview display of image data, displays a detection result showing whether an original corresponding to the image data has been detected as a monochromatic original or a color original.

4. The image forming apparatus as defined in claim 3, wherein
   the preview image display control portion, in a case where color detection of image data displayed for previewing has been erroneous detection, on receipt of modification instruction operation from a user, modifies a detection result of the image data displayed for previewing recorded in the detection result recording portion, and displays a preview again based on a detection result after modification.

* * * * *